US012138718B1

(12) United States Patent
Wu

(10) Patent No.: US 12,138,718 B1
(45) Date of Patent: Nov. 12, 2024

(54) METHOD OF THE CUTTING TOOL AND ITS STRUCTURE AND CORRESPONDING METHOD OF MACHINING ROTORS

(71) Applicant: National Central University, Taoyuan (TW)

(72) Inventor: Yu-Ren Wu, Taoyuan (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 0 days.

(21) Appl. No.: 18/231,882

(22) Filed: Aug. 9, 2023

(30) Foreign Application Priority Data

Jun. 9, 2023 (TW) ................. 112121594

(51) Int. Cl.
*B23P 15/00* (2006.01)
*B23P 15/28* (2006.01)

(52) U.S. Cl.
CPC .................. *B23P 15/28* (2013.01)

(58) Field of Classification Search
CPC ....... B23P 15/28; G05B 19/40938; B23F 5/16
USPC .......................................................... 76/115
See application file for complete search history.

(56) References Cited

U.S. PATENT DOCUMENTS

| | | | | |
|---|---|---|---|---|
| 5,201,795 | A * | 4/1993 | Howard | B23P 15/28 451/48 |
| 6,899,493 | B1 * | 5/2005 | Russell | B23P 15/28 407/43 |
| 2012/0298261 | A1 * | 11/2012 | Greiner | B27L 11/007 76/115 |
| 2017/0072550 | A1 * | 3/2017 | Moan | B23P 15/28 |
| 2017/0113289 | A1 * | 4/2017 | Sobczyk | B23F 5/16 |
| 2019/0338599 | A1 * | 11/2019 | Bellin | E21B 10/55 |
| 2021/0078119 | A1 * | 3/2021 | Schroeder | B23D 65/00 |
| 2021/0114150 | A1 * | 4/2021 | Giessler | B22F 5/10 |
| 2021/0260674 | A1 * | 8/2021 | Maeda | B23P 15/28 |
| 2022/0179390 | A1 * | 6/2022 | Shimoike | G05B 19/40938 |
| 2022/0266359 | A1 * | 8/2022 | Bubendorf | B24B 55/02 |

(Continued)

FOREIGN PATENT DOCUMENTS

| | | |
|---|---|---|
| CN | 101813930 A | 8/2010 |
| CN | 113557104 | 10/2021 |

(Continued)

OTHER PUBLICATIONS

Taiwan Intellectual Property Office First Office Action Search report on Sep. 28, 2023.

*Primary Examiner* — Omar Flores Sanchez
(74) *Attorney, Agent, or Firm* — WPAT, P.C

(57) ABSTRACT

The present invention provides a design method of cutting tool and its structure and the corresponding method of machining rotors. A control unit reads a workpiece parameter of a first workpiece using a sensor and produces an annulus parameter according to the workpiece parameter. The control unit further reads an angle parameter and a displacement parameter to intersect with the annulus parameter for giving a cutting edge parameter. Then the control unit produces a cutting-tool model parameter according to the cutting edge parameter and a spiral parameter. According to the cutting-tool model parameter, a cutting tool is manufactured. Afterwards, the cutting tool and the workpiece installed to a machine tool. By performing synchronous machining on a workpiece using the cutting tool, the workpiece can be cut into a rotor.

12 Claims, 18 Drawing Sheets

(56) References Cited

U.S. PATENT DOCUMENTS

| | | | | |
|---|---|---|---|---|
| 2023/0244206 A1* | 8/2023 | Bretschneider | ...... | G05B 19/182 |
| | | | | 700/160 |
| 2023/0264259 A1* | 8/2023 | Britt | ...... | B28D 1/041 |
| | | | | 419/1 |
| 2023/0390841 A1* | 12/2023 | Wu | ...... | B23F 21/10 |
| 2024/0278366 A1* | 8/2024 | Yasugi | ...... | G06F 16/248 |

FOREIGN PATENT DOCUMENTS

| | | |
|---|---|---|
| TW | M641918 | 6/2023 |
| WO | WO 2018078454 A1 | 5/2018 |

* cited by examiner reading the first spin-rate parameter and the second spin-rate parameter by the control unit, spinning the cutting tool at a first spin rate and a spin direction, spinning the second workpiece at a second spin rate and the spin direction, a spin-rate ratio of the first spin rate to t the he second rate being inversely proportional to a gear ratio of the cutting tool to the second workpiece — S200 controlling the cutting tool and the second workpiece to perform synchronous machining by the control unit and cutting the second workpiece for producing a rotor by the cutting tool — S210

FIG.14

METHOD OF THE CUTTING TOOL AND ITS STRUCTURE AND CORRESPONDING METHOD OF MACHINING ROTORS

BACKGROUND OF THE INVENTION

In order to obtain the outline of the rotor accurately in the manufacturing steps of the rotor according to the prior art, after the rough machining, the finishing machining by grinding is adopted, usually using a disc milling cutter or a finger milling cutter for rough machining. The remaining material and precision of rough machining will affect the quality of finishing, so the precision of rough machining is particularly important. In addition, because the current disc milling cutter can only generate a single groove in one processing cycle, when it is necessary to manufacture a workpiece with multiple thread grooves, the milling cutter can only be used to process another groove after processing one groove. This will result in considerably longer processing times.

One of the manufacturing steps of gears in the prior art is through the forming method. The forming method uses a forming tool with a matching inter-tooth shape to directly process the inter-tooth portion of the gear blank. Some processing method uses a single tool. After finishing the processing of one tooth, the dividing head rotates one tooth interval, and then processes the next tooth. The processing is completed in sequence, such as gear broaching, and forming milling.

Another technology is "whirlwind milling". "Whirlwind milling" is a screw processing method with high production efficiency. It is a high-speed and efficient thread milling equipment for various materials and the spindle speed of the processing machine is slow, so the movement accuracy of the machine tool is high and the dynamic stability is good. Unfortunately, it is only suitable for processing a workpiece with a single thread; it cannot process multiple teeth at the same time.

Gears can also be manufactured by casting. Large-scale gears are mostly manufactured by casting. The metal is heated and turned into a molten metal liquid. When it is molten, it is poured into a pre-made mold, and it is taken out after it cools and solidifies. Remove the sprue to get the required casting. Nonetheless, the precision is not high, and this method can be used for those who do not require high precision.

According to the prior art, if the precision is required, no matter whether the rotor or the gear is cut one tooth at a time or one groove is cut at a time, the processing time is quite lengthy.

Based on the above-mentioned problems, the present invention provides a design method of cutting tool and its structure and the corresponding method of machining rotors. By designing a cutting tool, the cutting tool is closely matched with one side of the workpiece and the cutting tool is used to cut the outside of the workpiece. With the parameter settings such as rotor spin angle and pitch circle radius, it has a small feed rate, and the finished workpiece has high precision and small error. In addition, multiple teeth and grooves can be cut simultaneously. By reducing the processing time, the present invention can achieve the effect of saving energy and power.

SUMMARY OF THE INVENTION

An objective of the present invention is to provide a machining method of cutting tool. A control unit reads parameters and produces a cutting tool according to the parameters. The workpiece cut by the cutting tool produced by this method own higher precision and lower error. In addition, multi-tooth rotors can cut simultaneously. Compared to the prior art, the present invention is more rapid and energy saving.

To achieve the above objective, the present invention provides a design method of cutting tool applied to a control unit. A spiral parameter is preset in the control unit and corresponding to the number of teeth. The design method of cutting tool comprises the following steps of:

The control unit controlling a sensor to scan a first workpiece and producing a workpiece parameter, the workpiece parameter corresponding to a first shaft and a first angle of the first workpiece; the control unit producing an annulus parameter according to the workpiece parameter, and the annulus parameter corresponding to a second shaft and a second angle of an annulus; the control unit reading one or more angle parameter and a displacement parameter and producing a cutting surface parameter, the cutting surface parameter being used for intersecting with the annulus parameter for producing a cutting edge parameter, the one or more angle parameter corresponding to a front cutting angle of the annulus, the displacement parameter corresponding to a cutting surface displacement, the cutting surface parameter corresponding to a front cutting surface of the annulus, and the cutting edge parameter corresponding to a cutting edge of the annulus; and the control unit producing a cutting-tool model parameter according to the cutting edge parameter and the spiral parameter, the cutting-tool model parameter including the second shaft, and the second shaft and the first shaft forming a shaft distance and a shaft angle. The control unit produces a contact line according to the annulus parameter and the workpiece parameter. The contact line corresponds to the contact between the annulus and the workpiece. The control unit produces a noninterference space according to the contact line. The front cutting surface is disposed in the noninterference space. Thereby, the rotor cut by the cutting tool produced by the method according to the present invention own higher precision and lower error. In addition, one or more thread of a rotor can be cut simultaneously.

According to an embodiment of the present invention, the annulus parameter includes an internal gear parameter corresponding to an internal gear of the annulus. The workpiece parameter includes an external gear corresponding to an external gear of the first workpiece.

According to an embodiment of the present invention, the annulus parameter is given by a difference set of the workpiece parameter. The first cutting surface parameter is given by disposing the cutting surface at the center of the annulus. The second cutting surface parameter is given by displacing the first cutting surface by the cutting surface displacement. The front cutting surface parameter is given by spinning the second cutting surface by one or more angle.

According to an embodiment of the present invention, after the step of the control unit producing a cutting-tool model parameter according to the cutting edge parameter and the spiral parameter, the method further comprises a step of producing a cutting tool using a machine tool according to the cutting-tool model parameter.

According to an embodiment of the present invention, in the step of the control unit producing a cutting-tool model parameter according to the cutting edge parameter and the spiral parameter, the method further comprises steps of: the control unit producing a first cutter model parameter according to the cutting edge parameter and the spiral parameter; and the control unit duplicating annularly the first cutter model parameter according to the second shaft for producing the cutting-tool model parameter.

Another objective of the preset invention is to provide a cutting tool. The workpieces cut by the cutting tool can produce products with higher precision and lower error. In addition, one or more thread of a rotor can be cut simultaneously.

To achieve the above objective, the present invention provides a cutting tool, which comprises: an annulus, including a penetrating hole at the center; a first cutter, including a first body disposed on and extending from one side of the annulus, a first side of the first body extending to a second side of the first body with increasing thickness on one side of the annulus, a curved-surface member connecting the first side of the first body to the second side of the first body, the second side of the first body located on one side of the penetrating hole, the curved-surface member extending downward with decreasing thickness to form a first cutting member, a second cutting member formed extending from the surface of the first body opposing to the first cutting member with decreasing thickness, and the first cutting member connecting to the second cutting member extending from the first side of the first body to the second side of the first body; and a second cutter, disposed at the bottom of the second side of the first body, including a second body disposed on and extending from one side of the annulus, a third side of the second body extending to a fourth side of the second body with increasing thickness on one side of the annulus, a curved-surface member connecting the third side of the second body to the fourth side of the second body, the fourth side of the second body located on one side of the penetrating hole, the curved-surface member extending downward with decreasing thickness to form a third cutting member, a fourth cutting member formed extending from the surface of the second body opposing to the third cutting member with decreasing thickness, the third cutting member connecting to the fourth cutting member extending from the third side of the second body to the fourth side of the second body, and the third side of the second body connecting to the second side of the first body.

According to an embodiment of the present invention, a pad is disposed on the first side of the first cutter; the pad is disposed on the third side of the second cutter.

Another objective of the present invention is to provide a method of machining rotors. By spinning the cutting tool and the workpiece concurrently at different spin rates, the product of cutting the workpiece will own higher precision and lower error.

To achieve the above objective, the present invention provides a method of machining rotors applied to a control unit and a cutting tool designed according to claim 1. The control unit presets a first spin-rate parameter of the cutting tool and a second spin-rate parameter of a second workpiece. The method of machining rotors comprises steps of: the control unit reading the first spin-rate parameter and the second spin-rate parameter, spinning the cutting tool at a first spin rate and a spin direction, spinning the second workpiece at a second spin rate and the spin direction, a spin-rate ratio of the first spin rate to the second rate being inversely proportional to a gear ratio of the cutting tool to the second workpiece; and the control unit controlling the cutting tool and the second workpiece to perform synchronous machining and the cutting tool cutting the second workpiece for producing a rotor.

According to an embodiment of the present invention, the synchronous machining can include the cutting tool being fed to the second workpiece, the second workpiece being fed to the cutting tool, and the cutting tool and the second workpiece being mutually fed.

According to an embodiment of the present invention, the rotor can be a lead screw, a gear, a worm screw, or a workpiece with spiral grooves.

According to an embodiment of the present invention, the rotor is a lead screw with a plurality of external threads. The plurality of external threads include a plurality of adjacent external thread grooves. The plurality of external thread grooves correspond to a plurality of first cutters of the cutting tool.

According to an embodiment of the present invention, the axis of the second workpiece is away from the axis of the cutting tool by a shaft distance and the two axes form a shaft angle.

BRIEF DESCRIPTION OF DRAWINGS

FIG. 14 shows a flowchart of the method of machining rotors using the cutting tool according to the present invention;

DETAILED DESCRIPTION OF THE INVENTION

In order to make the structure and characteristics as well as the effectiveness of the present invention to be further understood and recognized, the detailed description of the present invention is provided as follows along with embodiments and accompanying figures.

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

The rotor manufacturing methods according to the prior art are not suitable for processing screw workpieces with long axial dimensions, and each axial feed can only process a single spiral groove. These processing methods are inefficient and cannot process screws with different spiral angles, leading to inconvenience in manufacturing rotors. The present invention provides a cutting tool design method and its structure and corresponding rotor processing method. Multiple spiral grooves can be machined simultaneously. Screw workpieces with longer axial length can be processed as well. Consequently, the energy and time consumed in manufacturing multi-tooth screws can be reduced.

Figure 1:
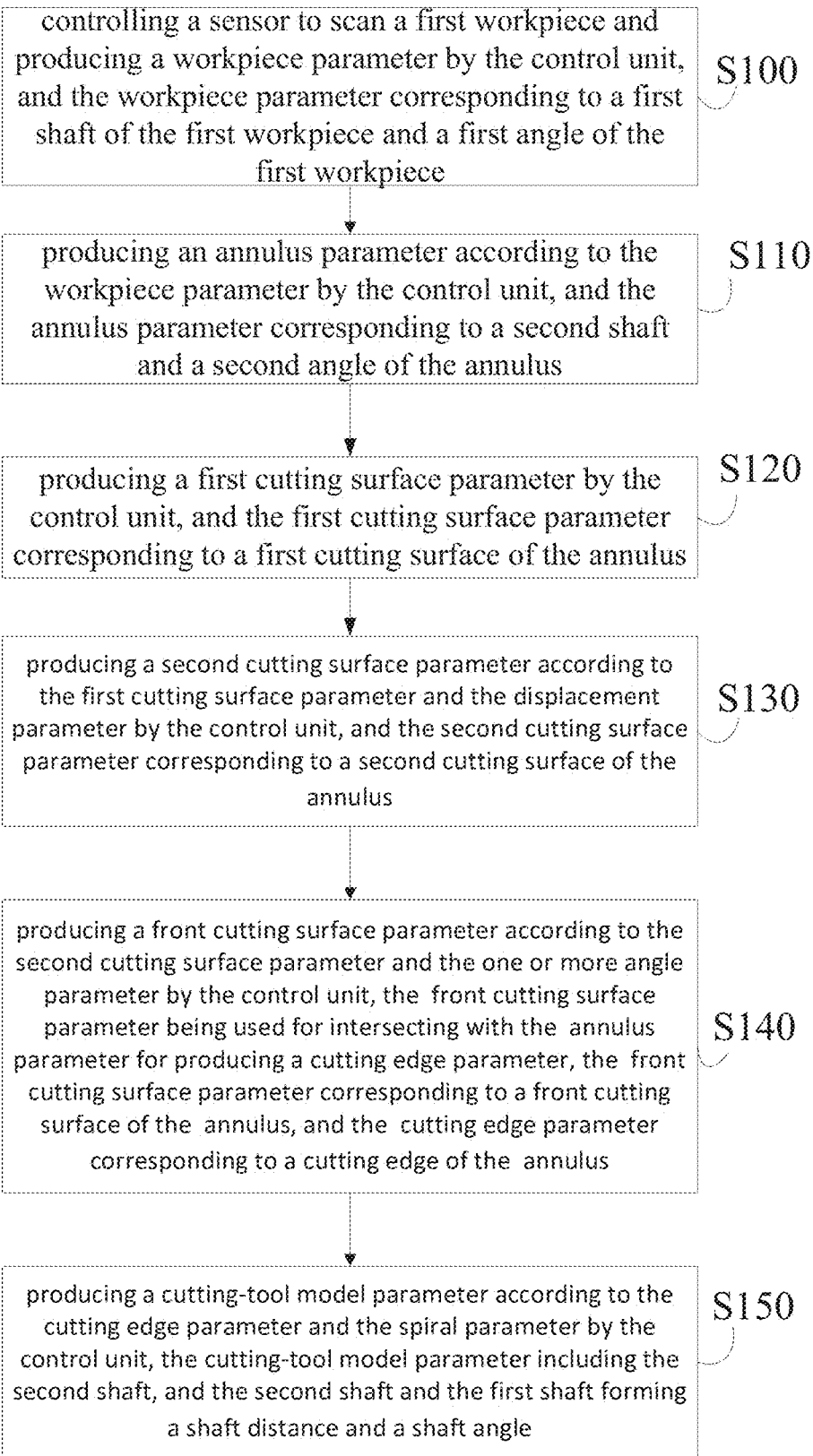
FIG. 1 shows a design flowchart of the cutting tool according to the present invention.

Next, please refer to FIG. 1, which shows a design flowchart of the cutting tool according to the present invention. As shown in the figure, how to machine a cutting tool will be described in the following.

Step S100: Controlling a sensor to scan a first workpiece and producing a workpiece parameter by the control unit, and the workpiece parameter corresponding to a first shaft of the first workpiece and a first angle of the first workpiece;

Step S110: Producing an annulus parameter according to the workpiece parameter by the control unit, and the annulus parameter corresponding to a second shaft and a second angle of the annulus;

Step S120: Producing a first cutting surface parameter by the control unit, and the first cutting surface parameter corresponding to a first cutting surface of the annulus;

Step S130: Producing a second cutting surface parameter according to the first cutting surface parameter and the displacement parameter by the control unit, and the second cutting surface parameter corresponding to a second cutting surface of the annulus;

Step S140: Producing a front cutting surface parameter according to the second cutting surface parameter and the one or more angle parameter by the control unit, the front cutting surface parameter being used for intersecting with the annulus parameter for producing a cutting edge parameter, the front cutting surface parameter corresponding to a front cutting surface of the annulus, and the cutting edge parameter corresponding to a cutting edge of the annulus; and Step S150: Producing a cutting-tool model parameter according to the cutting edge parameter and the spiral parameter by the control unit, the cutting-tool model parameter including the second shaft, and the second shaft and the first shaft forming a shaft distance and a shaft angle.

Next, the steps will be described in detail as follows.

Figure 2:
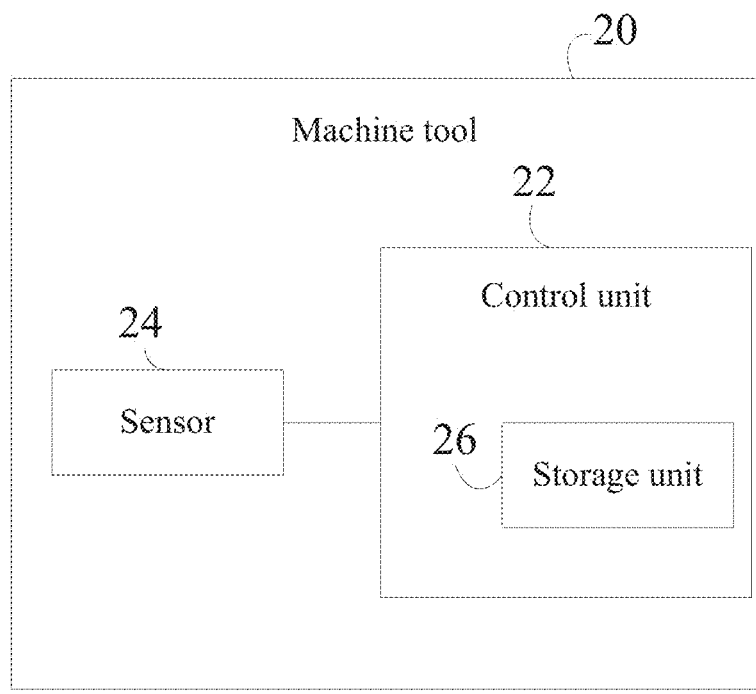
FIG. 2 shows a block diagram of the method for machining cutting tool according to the present invention.

First, please refer to FIG. 1 and FIG. 2. FIG. 2 shows a block diagram of the method for machining cutting tool according to the present invention. As shown in the figure, how to machine the cutting tool 10 will be illustrated in the following.

The present invention is applied to a machine tool 20, which includes a control unit 22 and a sensor 24. The sensor 24 is connected to the control unit 22. The control unit 22 further includes a storage unit 26. One or more angle parameter, a displace parameter, and a spiral parameter are preset in the storage unit 26 of the control unit 22. The spiral parameter corresponds to a number of teeth of the annulus. The one or more angle parameter corresponds to a front cutting angle of the annulus. The displacement parameter corresponds to a cutting surface displacement.

Figure 3:
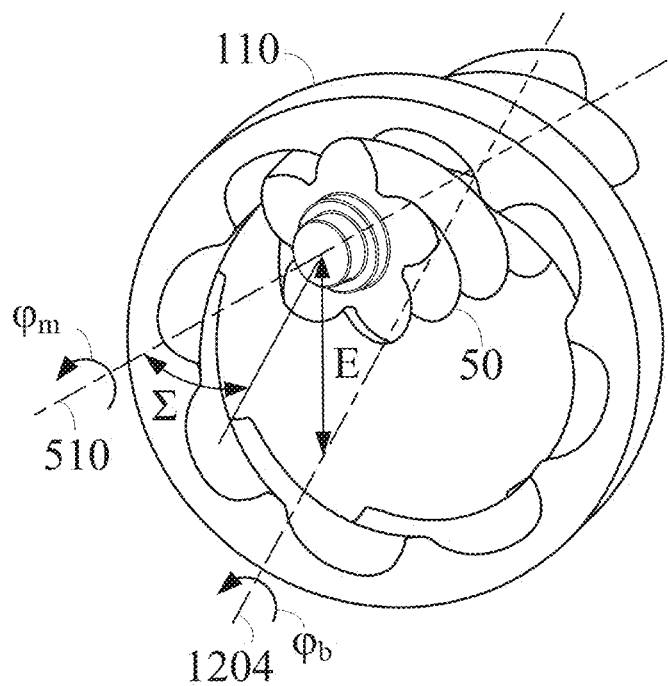
FIG. 3 shows a schematic diagram of the rotor according to the present invention.

Please refer to FIG. 1, FIG. 2, and FIG. 3. FIG. 3 shows a schematic diagram of the rotor according to the present invention. As shown in the figure, in the step S100, the control unit 22 controls the sensor 24 to scan a first workpiece 50 and produce a workpiece parameter. The workpiece parameter corresponds to a first shaft 510 and a first angle $\varphi_m$ of the first workpiece 50.

According to the present embodiment, the sensor 24 detected by a CNC machine scans the outline of the first workpiece 50 and produces the workpiece parameter corresponding to the first workpiece 50. The workpiece parameter includes the first shaft 510 and the first angle $\varphi_m$, and various location vectors (not shown in the figures) corresponding to the first workpiece. The first workpiece 50 can be a workpiece having spiral groves such as a lead screw, a worm screw, a ball screw, or Roots rotors.

Next, please refer to FIG. 1, FIG. 2, and FIG. 3. As shown in the figures, in the step S110, the control unit 22 produces an annulus parameter according to the workpiece parameter, and the annulus parameter corresponding to a second shaft 1204 and a second angle $\varphi_b$ of the annulus 110.

According to the present embodiment, as shown in FIG. 3, the difference set between the workpiece parameter produced by the CNC machine in the step S100 and the workpiece parameter produces the annulus parameter of the outline of the first workpiece 50. The annulus parameter corresponds to the annulus 110. The internal outline of the annulus 110 corresponds to the external outline of the first workpiece 50. The annulus parameter includes the second shaft 1204 and the second angle $\varphi_b$ and corresponds to various location vectors (not shown in the figures) of the annulus 110. The first shaft 510 and the second shaft 1204 form a shaft distance E and a shaft angle Σ.

Figure 4:
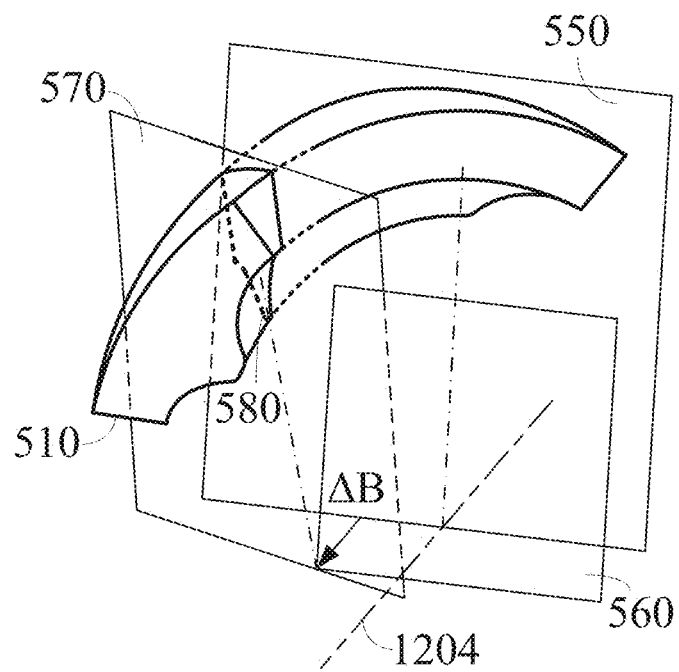
FIG. 4 shows a schematic diagram of the front cutting surface according to the present invention.

Next, please refer to FIG. 4, which shows a schematic diagram of the front cutting surface according to the present invention. As shown in the figure, the control unit 22 produces a first cutting surface parameter according to the annulus parameter. The first cutting surface parameter corresponds to a first cutting surface 550 of the annulus 110.

Please refer to Figure again, In the step S130, the control unit 22 produces a second cutting surface parameter according to the first cutting surface parameter and the displacement parameter, the second cutting surface parameter corresponding to a second cutting surface 560 of the annulus 110, and the displacement parameter corresponding to a cutting surface displacement ΔB.

According to the present embodiment, to avoiding over cutting while the cutting tool 10 cutting workpiece, a cutting surface of the cutting tool 10 should be designed within the noninterference space. Thereby, the cutting surface is displaced by the cutting surface displace ΔB. By further rotating the angle of the front cutting surface 572, the front cutting surface 570 is produced. By intersecting the annulus 110 and the front cutting surface 572, the cutting edge 580 will be produced.

Figure 5A:
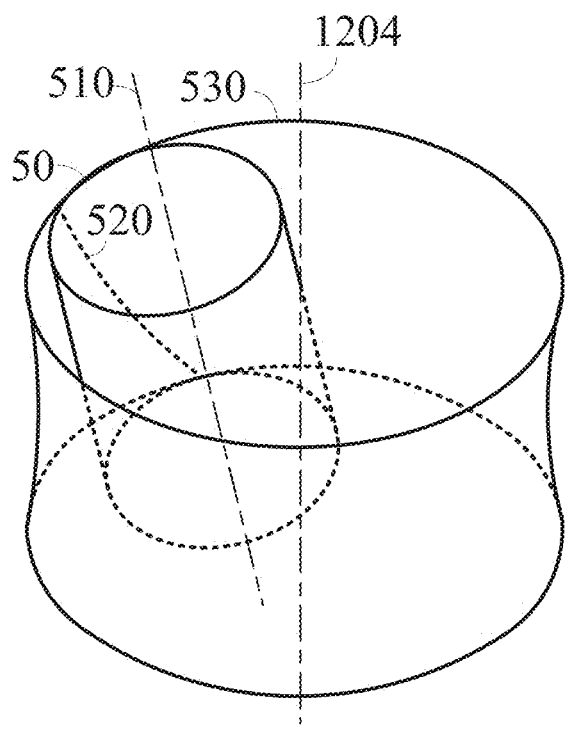
FIG. 5A shows a schematic diagram of the pitch surface according to the present invention.
Figure 5B:
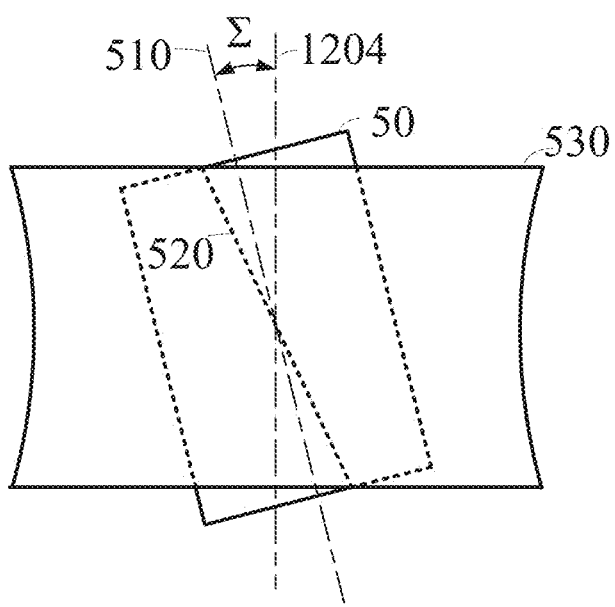
FIG. 5B shows a side view of the pitch surface according to the present invention.

Concerning the technology of noninterference space, please refer to FIG. 5A and FIG. 5B. FIG. 5A shows a schematic diagram of the pitch surface according to the present invention; FIG. 5B shows a side view of the pitch surface according to the present invention. By considering the first workpiece 50 as a cylinder, a contact line 520 of a pitch surface 530 of the first workpiece 50 and the annulus 110 is a curve.

Figure 6:
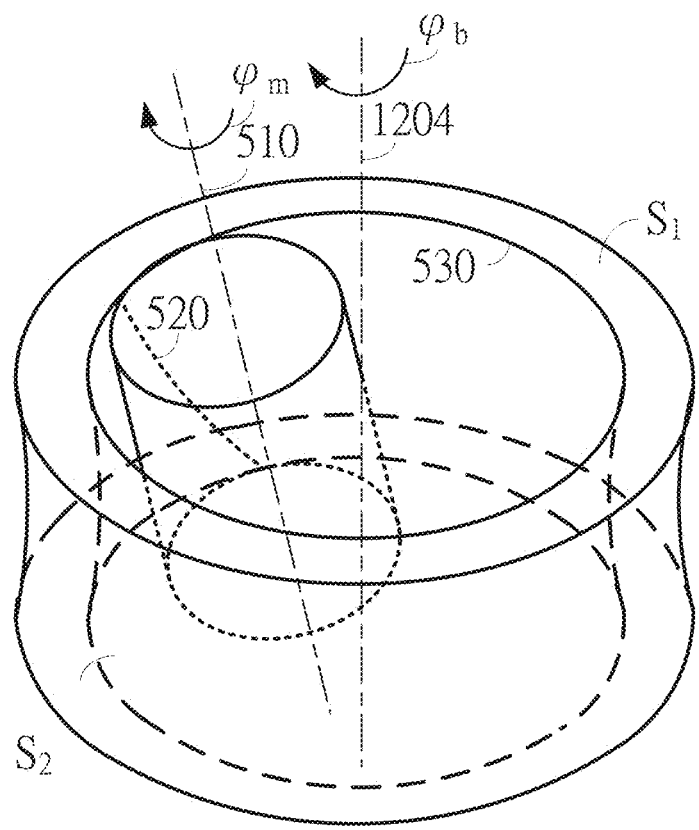
FIG. 6 shows a schematic diagram of the noninterference space according to the present invention.

Next, please refer to FIG. 6, which shows a schematic diagram of the noninterference space according to the present invention. As shown in the figure, by rotating the contact line 520 about the second shaft 1204 for one circle, the space can be divided into an internal space and an external space. The internal space is an interference space S2; the external space is the noninterference space S1. When the cutter 540 of the cutting tool 10 is located in the interference space S2, the over-cutting phenomenon will occur when the cutting tool 10 performs cutting. When the cutter 540 of the cutting tool 10 is located in the noninterference space S1, no over-cutting phenomenon will occur.

Figure 7:
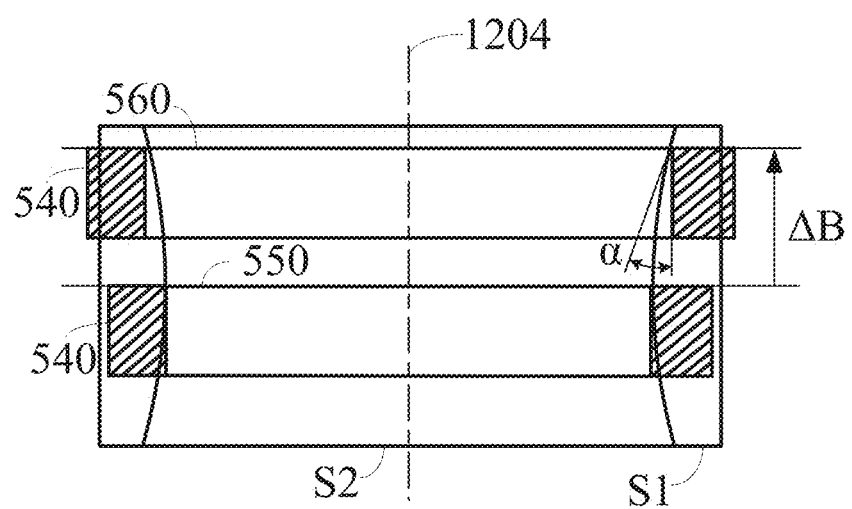
FIG. 7 shows a side view of the noninterference space according to the present invention.

Next, please refer to FIG. 7, which shows a side view of the noninterference space according to the present invention. As shown in the figure, when the cutter 540 is designed at the first cutting surface 550, a portion of the cutter 540 will be located in the interference space S2 and hence leading to the over-cutting phenomenon. Thereby, according to the present invention, the cutter 540 is displaced by the cutting surface displacement ΔB for displacing the cutter 540 from the first cutting surface 550 to the second cutting surface 560. Then the cutter 540 can be entirely located in the noninterference space S1 and producing a tip angle α, which facilitates removal of scraps produced during cutting.

In the step S140, the control unit 22 produces a front cutting surface parameter according to the second cutting surface parameter and the one or more angle parameter. The front cutting surface parameter is used for intersecting with the annulus parameter for producing a cutting edge parameter. The front cutting surface parameter corresponds to a front cutting surface 570 of the annulus 110. The cutting edge parameter corresponds to a cutting edge 580 of the annulus 110. The front cutting surface 570 can be orthogonal to the spiral line.

Figure 8:
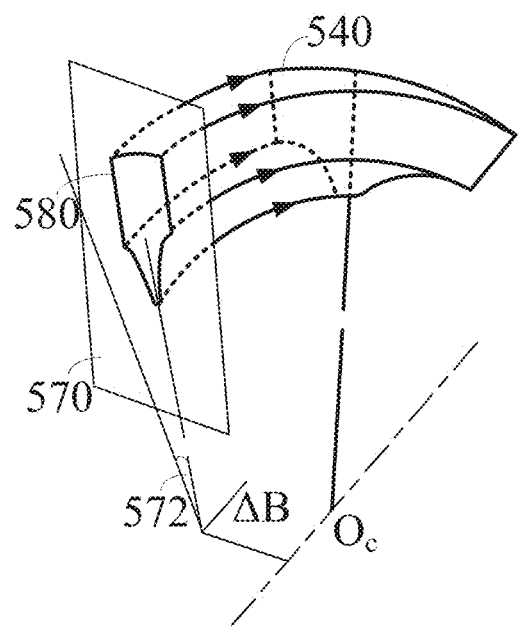
FIG. 8 shows a schematic diagram of the front cutting surface according to the present invention.

Next, please refer to FIG. 4 again and to FIG. 8, which shows a schematic diagram of the front cutting surface according to the present invention. After the cutter 540 is displaced from the first cutting surface 550 to the second cutting surface 560, for the convenience of cutting removal of scraps, the second cutting surface is rotated by the front cutting angle 572 and thus further forming the front cutting surface 570. The front cutting angle 572 is the angle between the normal of the first workpiece 50 and the direction vector of the front cutting surface 570.

In the step S150, the control unit 22 produces a cutting-tool model parameter according to the cutting edge parameter and the spiral parameter. The cutting-tool model parameter includes the second shaft 1204. The second shaft 1204 and the first shaft 510 form a shaft distance E and a shaft angle Σ.

Figure 9:
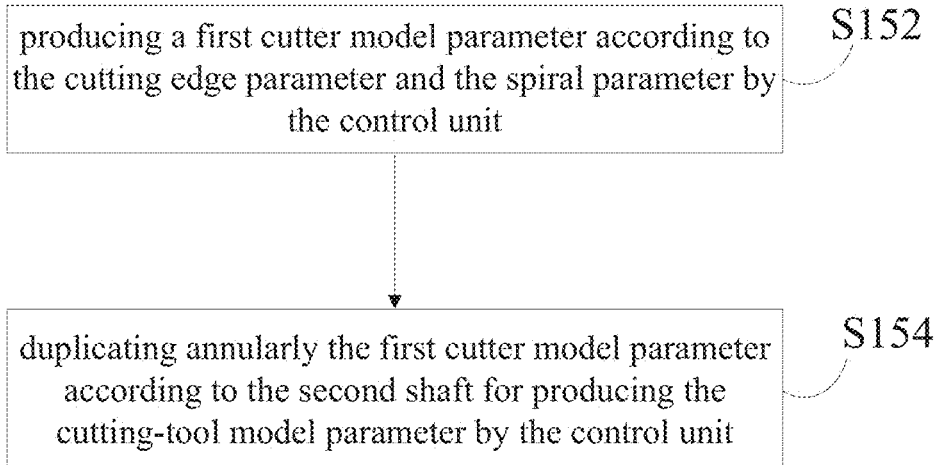
FIG. 9 shows a flowchart of producing the cutting-tool model parameter according to the present invention.

Next, please refer to FIG. 9, which shows a flowchart of producing the cutting-tool model parameter according to the present invention. As shown in the figure, the step S150 comprises steps of:

Step S152: Producing a first cutter model parameter according to the cutting edge parameter and the spiral parameter by the control unit; and Step S154: Duplicating annularly the first cutter model parameter according to the second shaft for producing the cutting-tool model parameter by the control unit.

In the following, the steps will be illustrated in detail.

In the step S152, the control unit 22 produces a first cutter model parameter according to the cutting edge parameter and the spiral parameter. Please refer to FIG. 8 again. The control unit 22 controls to sweep backwards and spirally to form the cutter 540 according to the cutting edge parameter and the spiral parameter. The spiral parameter corresponds to the number of teeth of the cutting tool 10 to be manufactured.

Figure 10:
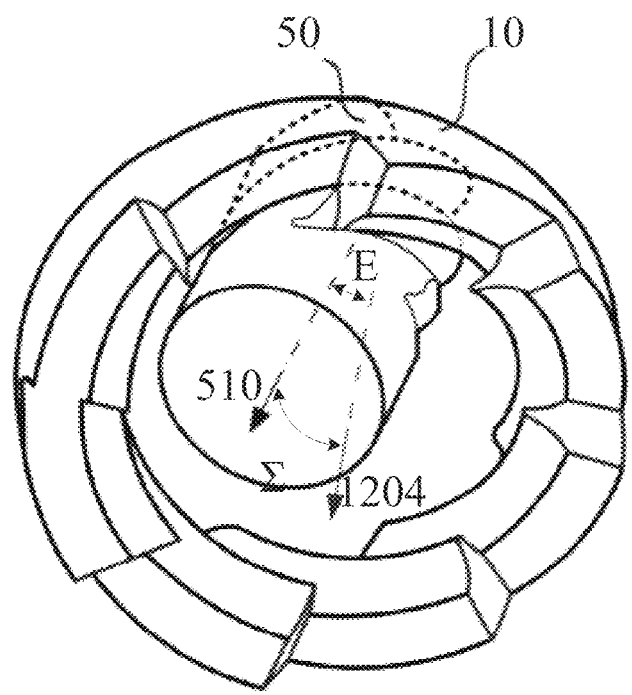
FIG. 10 shows a schematic diagram of the cutting tool according to the present invention.

In the step S154, the control unit 22 duplicates annularly the first cutter model parameter according to the second shaft for producing the cutting-tool model parameter. Next, please refer to FIG. 10, which shows a schematic diagram of the cutting tool according to the present invention. As shown in the figure, after acquiring the first cutter model parameter, by duplicating annularly about the second shaft, the cutting tool 10 capable of cutting a rotor with multiple teeth according to the present invention will be manufactured.

By summarizing the above description, in addition to enhancing cutting precision, the designed cutting tool 10 according to the present embodiment can machine one or more thread of the rotor simultaneously. Compared with the methods according to the prior art, which not only can machine only a single spiral groove in each axial feed, but also cannot process workpieces with different spiral angles, the present embodiment not only processes at least one thread of the rotor at the same time, but also can adjust the spiral angle of processing with larger radius and slower spin rate. Thereby, the time spent on workpiece manufacturing is greatly reduced, not only energy saving and carbon reduction, but also the speed of tool consumption is much slower than the methods according to the prior art.

According to an embodiment of the present invention, the machine tool 20 is used to manufacture the cutting tool 10 according to the cutting-tool model parameter.

Figure 11A:
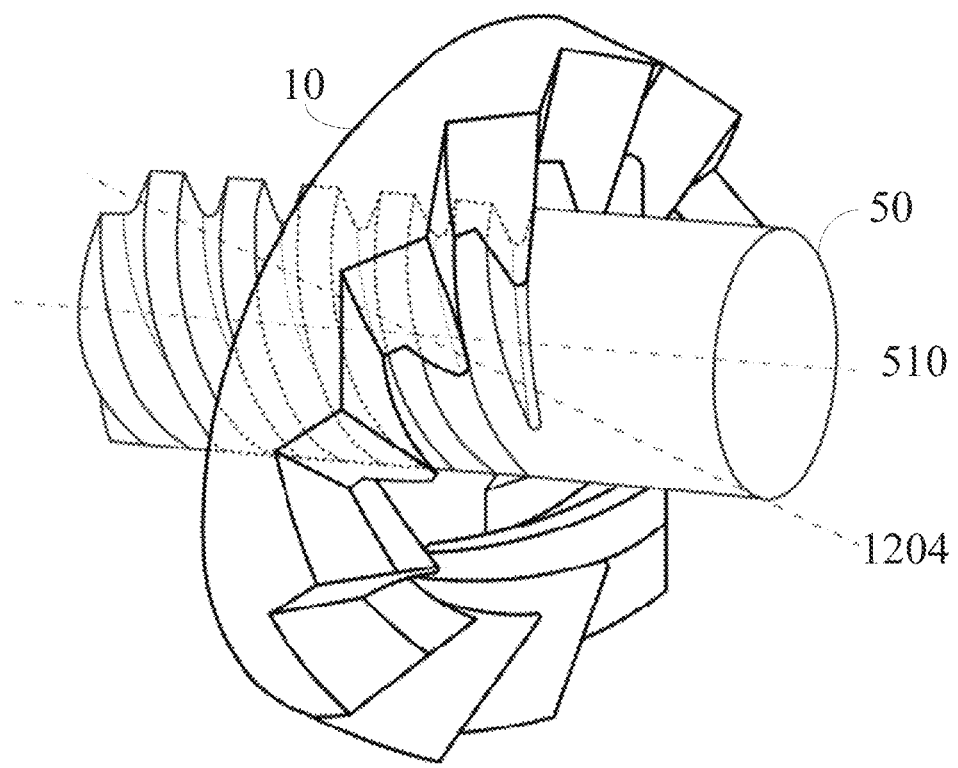
FIG. 11A shows a schematic diagram of the cutting tool cutting a worm screw according to the present invention.
Figure 11B:
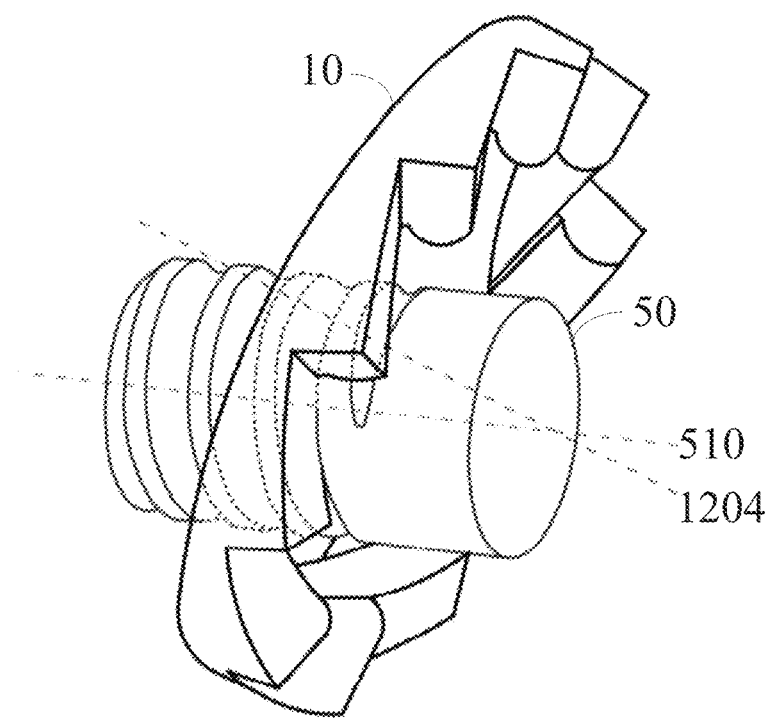
FIG. 11B shows a schematic diagram of the cutting tool cutting a ball screw according to the present invention.

According to an embodiment of the present invention, please refer to FIG. 11A and FIG. 11B. FIG. 11A shows a schematic diagram of the cutting tool cutting a worm screw according to the present invention; FIG. 11B shows a schematic diagram of the cutting tool cutting a ball screw according to the present invention. As shown in FIG. 11A, the first workpiece 50 to be cut by the cutting tool 10 is a worm screw with triple thread. As shown in FIG. 11B, the first workpiece 50 to be cut by the cutting tool 10 can be a ball screw with single thread. Thereby, the first workpiece 50 to be cut by the cutting tool 10 according to the present invention can be any workpiece having spiral grooves such as a lead screw, a gear, or a worm screw. In addition, no matter single thread or multiple threads, the cutting tool 10 according to the present invention can manage to cut.

According to an embodiment of the present invention, the cutting tool 10 or the annulus 110 are manufactured by grinding wheel materials. The annular grinding wheel can be used in precision machining of a lead screw or a multi-tooth rotor.

According to an embodiment of the present invention, the length of the first cutter 130 can be shortened to be a disposable cutter and installed to the cutter frame according to the prior art to achieve the same performance. The present invention does not require that the cutting tool 10 should be formed integrally.

By summarizing the above description, in addition to enhancing cutting precision, the manufactured cutting tool 10 according to the present embodiment can machine one or more thread of the rotor simultaneously. Compared with the methods according to the prior art, which not only can machine only a single spiral groove in each axial feed, but also cannot process workpieces with different spiral angles, the present embodiment not only processes at least one thread of the rotor at the same time, but also can adjust the spiral angle of processing with larger radius and slower spin rate. Thereby, the time spent on workpiece manufacturing is greatly reduced, not only energy saving and carbon reduction, but also the speed of tool consumption is much slower than the methods according to the prior art.

Figure 12:
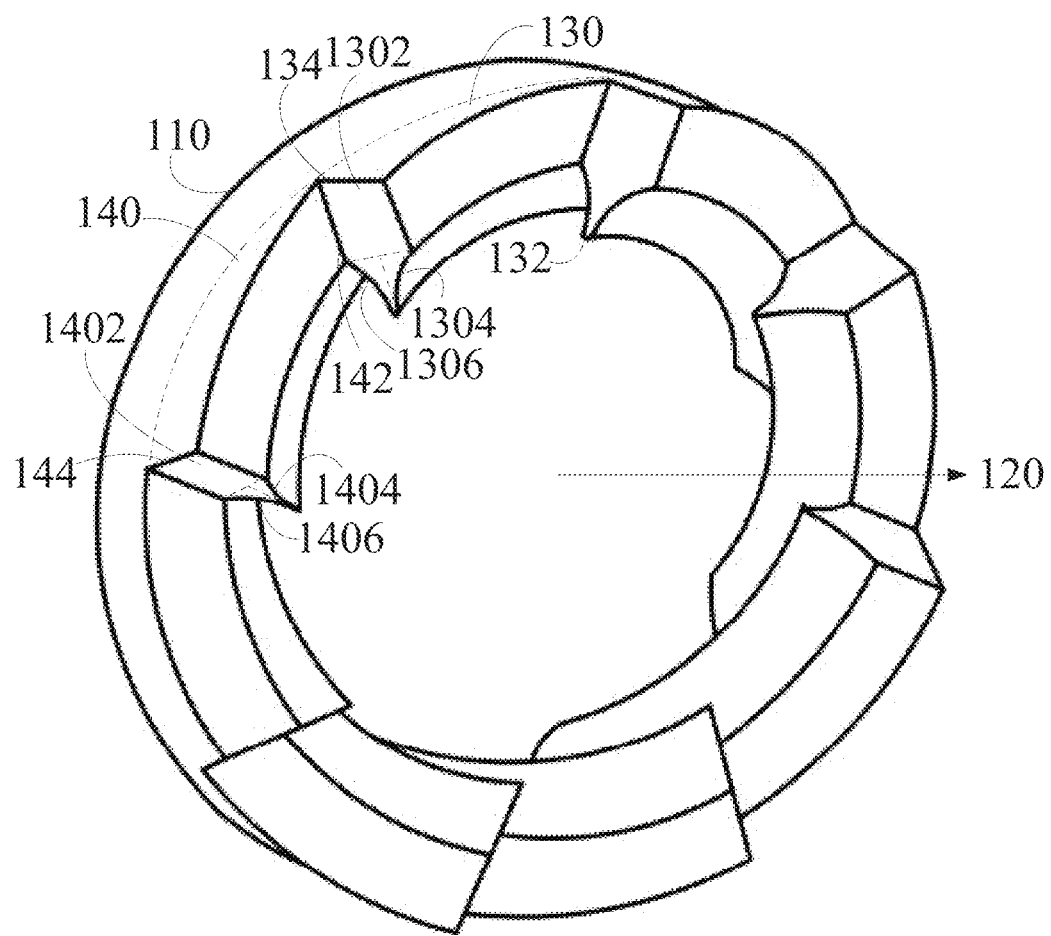
FIG. 12 shows a structure of the cutting tool according to the present invention.

Next, please refer to FIG. 12, which shows a structure of the cutting tool according to the present invention. As shown in the figure, the structure is a cutting tool, which comprises an annulus 110, a penetrating hole 120, a first cutter 130, and a second cutter 140.

The penetrating hole 120 is disposed at the center of the annulus 110. The first cutter 130 includes a first body 1302, a first side 132 of the first body 1302, a second side 134 of the first body 1302, a first cutting member 1304, a second cutting member 1306, a curved-surface member connecting the first side 132 of the first body 1302 to the second side 134 of the first body 1302, the second side 134 of the first body 1302 located on one side of the penetrating hole 120, the curved-surface member extending downward with decreasing thickness to form the first cutting member 1304, the second cutting member 1306 formed extending from the surface of the first body 1302 opposing to the first cutting member 1304 with decreasing thickness, and the first cutting member 1304 connecting to the second cutting member 1306 extending from the first side 132 of the first body 1302 to the second side 134 of the first body 1302. The second cutter 140 includes a second body 1402, a third side 142 of the second body 1402, a fourth side 144 of the second body 1402, a third cutting member 1404, a fourth cutting member 1406, a curved-surface member connecting the third side 142 of the second body 1402 to the fourth side 144 of the second body 1402, the fourth side 144 of the second body 1402 located on one side of the penetrating hole 120, the curved-surface member extending downward with decreasing thickness to form the third cutting member 1404, the fourth cutting member formed extending from the surface of the second body 1402 opposing to the third cutting member 1404 with decreasing thickness, the third cutting member 1404 connecting to the fourth cutting member 1406 extending from the third side 142 of the second body 1402 to the fourth side 144 of the second body 1402, and the third side 142 of the second body 1402 connecting to the second side 134 of the first body 1302.

Put the first cutting member 1304 and the second cutting member 1306 of the first cutter 130 and the third cutting member 1404 and the fourth cutting member 1406 of the second cuter 140 against the workpiece to be cut. Next, spin the cutting tool 10 and cut the workpiece to be cut. Then the first cutting member 1304 and the second cutting member 1306 of the first cutter 130 and the third cutting member 1404 and the fourth cutting member 1406 of the second cuter 140 can cut the grooves for the workpiece to be cut and form a rotor.

Figure 13:
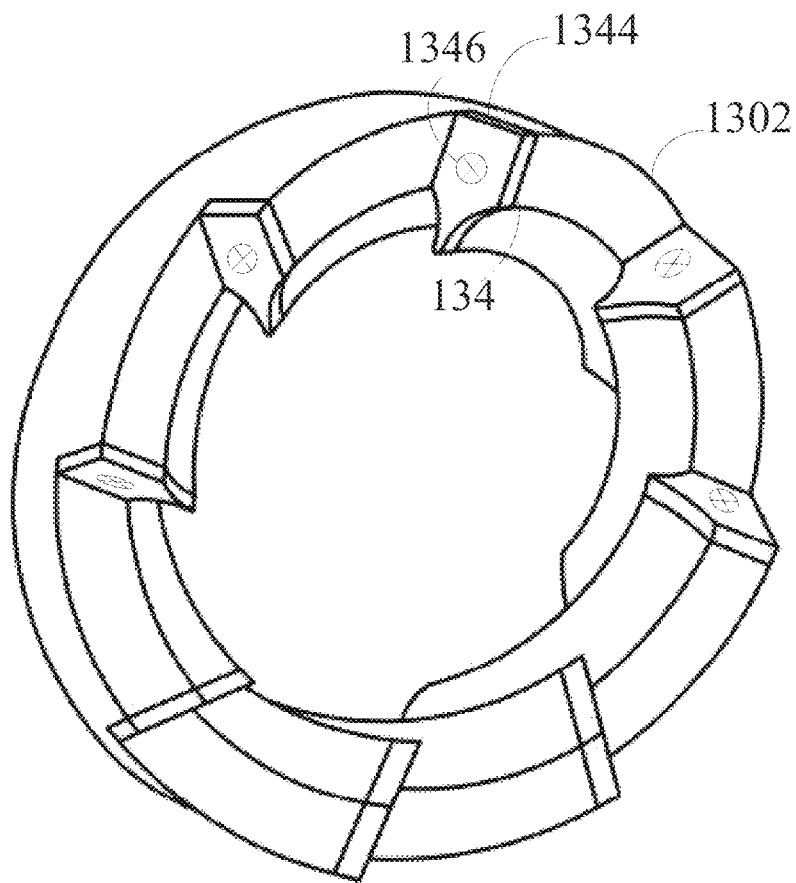
FIG. 13 shows a schematic diagram of the cutting tool with pads according to the present invention.

Next, please refer to FIG. 13, which shows a schematic diagram of the cutting tool with pads according to the present invention. As shown in the figure, according to the present embodiment, a pad 1344 is fixed to the second side 134 of the first body 1302 via a locking part 1346. Alternatively, the pad 1344 can be bonded to the second side 134 of the first body 1302 via gluing or soldering for replacing the cutting surface of the cutting tool 10.

By summarizing the above description, the rotor cut by the cutting tool according to the present invention own higher precision and lower error than the one manufactured according to the prior art. In addition, the flow of manufacturing rotor becomes more rapid and convenient because one or more thread can be cut simultaneously. Furthermore, a rotor workpiece with longer axial length can be machined as well.

To cut rotors with higher precision and lower error, the present invention provides a method of machining rotors by a cutting tool.

First, please refer to FIG. 14, which shows a flowchart of the method of machining rotors using the cutting tool according to the present invention. In the following, how to machine a second workpiece using a cutting tool will be illustrated.

Step S200: Reading the first spin-rate parameter and the second spin-rate parameter by the control unit, spinning the cutting tool at a first spin rate and a spin direction, spinning the second workpiece at a second spin rate and the spin direction, a spin-rate ratio of the first spin rate to the second rate being inversely proportional to a gear ratio of the cutting tool to the second workpiece; and Step S210: Controlling the cutting tool and the second workpiece to perform synchronous machining by the control unit and cutting the second workpiece for producing a rotor by the cutting tool.

Next, the steps will be described in detail. First, please refer to FIG. 15, which shows a block diagram of the method of machining rotors using the cutting tool according to the present invention. In the following, how to machine the second workpiece using the cutting tool 10 will be illustrated.

Figure 15:
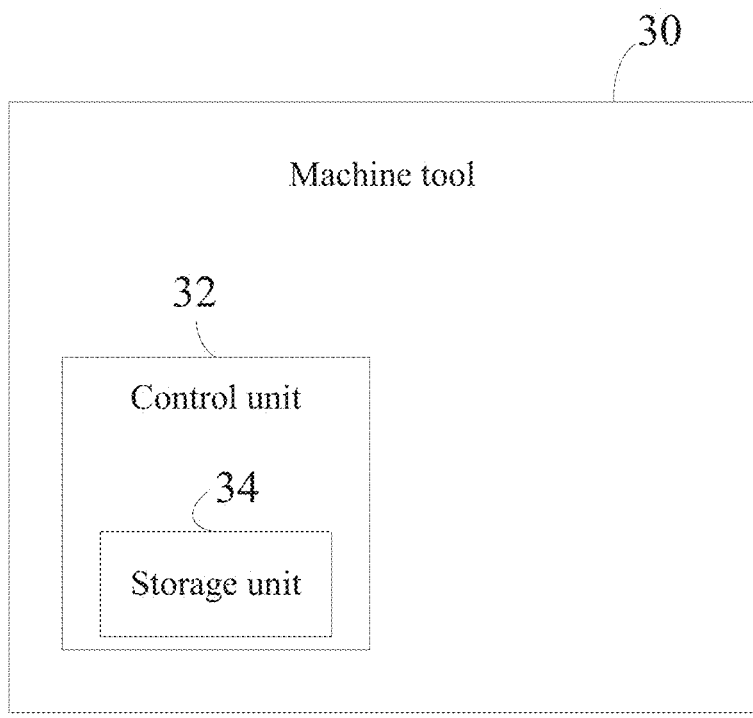
FIG. 15 shows a block diagram of the method of machining rotors using the cutting tool according to the present invention.

As shown in FIG. 15, the present invention is applied to a machine tool 30, which includes a control unit 32. The control unit 32 further includes a storage unit 34. A first spin-rate parameter of the cutting tool 10 and a second spin-rate parameter of a second workpiece 60 are preset in the storage unit 34 of the control unit 32.

Figure 16:
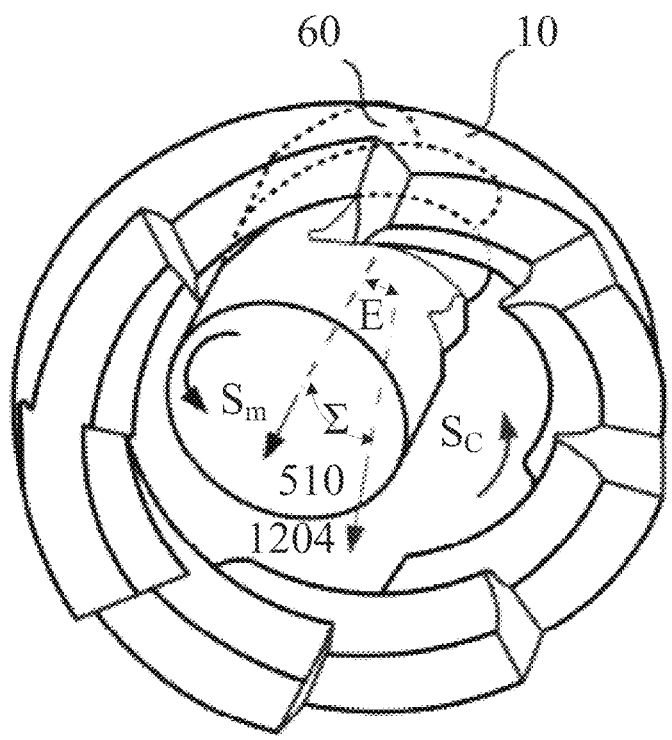
FIG. 16 shows a schematic diagram of spin of the cutting tool according to the present invention.

Please refer to FIG. 16, which shows a schematic diagram of spin of the cutting tool according to the present invention. As shown in the figure, in the step S200, the control unit 32 reads the first spin-rate parameter and the second spin-rate parameter. The control unit 32 spins the cutting tool 10 at a first spin rate $S_c$ and a spin direction $C_1$ and spins the second workpiece 60 at a second spin rate $S_m$ and the spin direction $C_1$. The spin-rate ratio of the first spin rate $S_c$ to the second rate $S_m$ is inversely proportional to a gear ratio of the cutting tool 10 to the second workpiece 60. Besides, a first shaft 510 of the second workpiece 60 and a second shaft 1204 of the cutting tool 10 form a shaft distance E and a shaft angle Σ.

Figure 17:
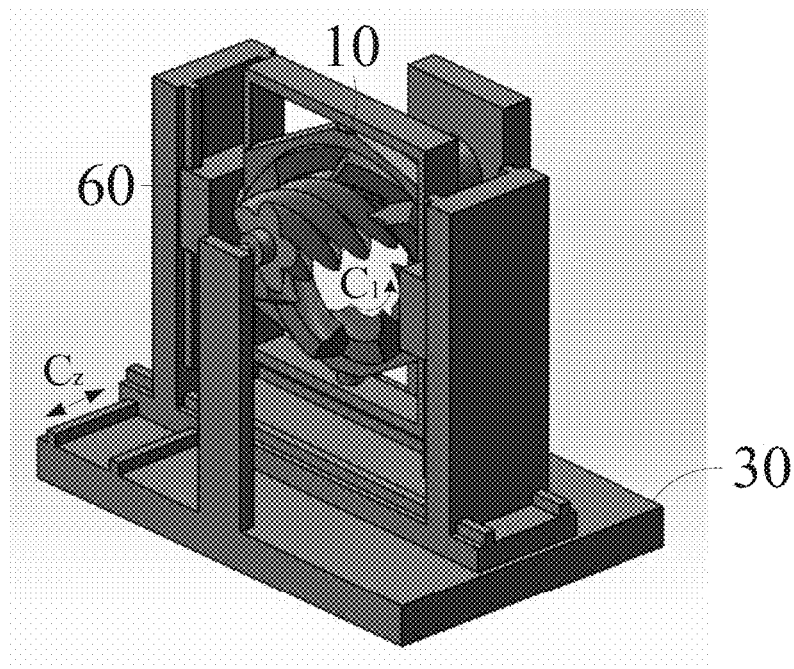
FIG. 17 shows a schematic diagram of installing the cutting tool on a machine tool according to the present invention.

Next, please refer to FIG. 17, which shows a schematic diagram of installing the cutting tool on a machine tool according to the present invention. As shown in the figure, the cutting tool 10 and the second workpiece 60 are installed to the machine tool 30. The cutting tool 10 is spun at the first spin rate $S_c$ and the second workpiece 60 is spun at the second spin rate $S_m$ in the same direction. The synchronous machining is performed on the second workpiece 60 along the direction $C_Z$.

Figure 18:
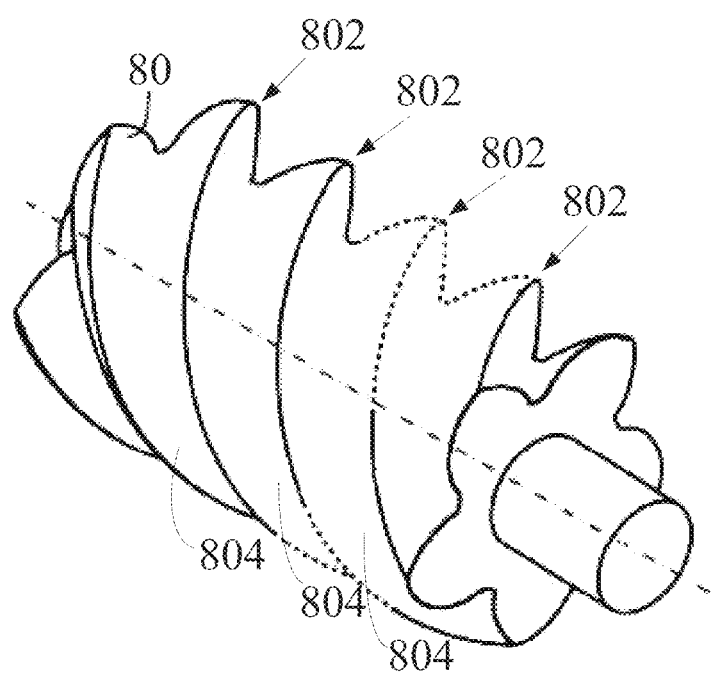
FIG. 18 shows a schematic diagram of the rotor according to the present invention.

Please refer to FIG. 17 and FIG. 18. FIG. 18 shows a schematic diagram of the rotor according to the present invention. In the step S210, the control unit 32 controls the cutting tool 10 and the second workpiece 60 to perform synchronous machining and the cutting tool 10 cuts the second workpiece 60 for producing the rotor 80. The rotor 80 includes internal threads 802 and external thread grooves 804.

The rotor 80 can be any workpiece having spiral grooves such a lead screw, a gear, or a worm screw. Moreover, no matter single thread or multi-thread, this method can be adopted for cutting.

The synchronous machining is synchronous motion of the cutting tool 10 and the second workpiece 60 and includes the cutting tool 100 being fed to the second workpiece 60, the second workpiece 60 being fed to the cutting tool 10, and the cutting tool 10 and the second workpiece 60 being mutually fed.

By summarizing the above description, in addition to enhancing cutting precision, the cutting tool 10 according to the present invention can machine multiple spiral grooves simultaneously and longer rotor workpiece with adjustable spiral angle. Compared to the machine tool according to the prior art, the method according to the present invention can significantly save process steps, time, and energy. The compatible workpiece is also more versatile than the prior art.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A design method of cutting tool, applied to a control unit, the control unit presetting one or more angle parameter, a displacement parameter, and a spiral parameter, the spiral parameter corresponding to the number of teeth of an annulus, the one or more angle parameter corresponding to a front cutting angle of the annulus, the displacement parameter corresponding to a cutting surface displacement, and the design method of cutting tool comprising steps of:

controlling a sensor to scan a first workpiece and producing a workpiece parameter by the control unit, and the workpiece parameter corresponding to a first shaft of the first workpiece and a first angle of the first workpiece;

producing an annulus parameter according to the workpiece parameter by the control unit, and the annulus parameter corresponding to a second shaft and a second angle of the annulus;

producing a first cutting surface parameter by the control unit, and the first cutting surface parameter corresponding to a first cutting surface of the annulus;

producing a second cutting surface parameter according to the first cutting surface parameter and the displacement parameter by the control unit, and the second cutting surface parameter corresponding to a second cutting surface of the annulus;

producing a front cutting surface parameter according to the second cutting surface parameter and the one or more angle parameter by the control unit, the front cutting surface parameter being used for intersecting with the annulus parameter for producing a cutting edge parameter, the front cutting surface parameter corresponding to a front cutting surface of the annulus, and the cutting edge parameter corresponding to a cutting edge of the annulus; and producing a cutting-tool model parameter according to the cutting edge parameter and the spiral parameter by the control unit, the cutting-tool model parameter including the second shaft, and the second shaft and the first shaft forming a shaft distance and a shaft angle;

wherein produces a contact line according to the annulus parameter and the workpiece parameter by the control unit; the contact line corresponds to a contact line between the annulus and the workpiece; produces a noninterference space according to the contact line by the control unit; and the front cutting surface is disposed in the noninterference space.

2. The design method of cutting tool of claim 1, wherein the annulus parameter is given by a difference set of the workpiece parameter; the first cutting surface parameter is given by disposing the cutting surface at the center of the annulus; the second cutting surface parameter is given by displacing the first cutting surface by the cutting surface displacement; and the front cutting surface parameter is given by rotating the second cutting surface by one or more angle.

3. The design method of cutting tool of claim 1, wherein the annulus parameter includes an internal gear parameter corresponding to an internal gear of the annulus; and the workpiece parameter includes an external gear parameter corresponding to an external gear of the first workpiece.

4. The design method of cutting tool of claim 1, and after the step of producing a cutting-tool model parameter according to the cutting edge parameter and the spiral parameter by the control unit, further comprising a step of producing a cutting tool using a machine tool according to the cutting-tool model parameter.

5. The design method of cutting tool of claim 1, wherein the step of producing a cutting-tool model parameter according to the cutting edge parameter and the spiral parameter by the control unit includes:

producing a first cutter model parameter according to the cutting edge parameter and the spiral parameter by the control unit; and duplicating annularly the first cutter model parameter according to the second shaft for producing the cutting-tool model parameter by the control unit.

6. A cutting tool, comprising:

an annulus, including a penetrating hole at the center;

a first cutter, including a first body disposed on and extending from one side of the annulus, a first side of the first body extending to a second side of the first body with increasing thickness on one side of the annulus, a curved-surface member connecting the first side of the first body to the second side of the first body, the second side of the first body located on one side of the penetrating hole, the curved-surface member extending downward with decreasing thickness to form a first cutting member, a second cutting member formed extending from surface of the first body opposing to the first cutting member with decreasing thickness, and the first cutting member connecting to the second cutting member extending from the first side of the first body to the second side of the first body; and a second cutter, disposed at the bottom of the second side of the first body, including a second body disposed on and extending from one side of the annulus, a third side of the second body extending to a fourth side of the second body with increasing thickness on one side of the annulus, a curved-surface member connecting the third side of the second body to the fourth side of said second body, said fourth side of said second body located on one side of said penetrating hole, the curved-surface member extending downward with decreasing thickness to form a third cutting member, a fourth cutting member formed extending from a surface of the second body opposing to the third cutting member with decreasing thickness, the third cutting member connecting to the fourth cutting member extending from the third side of the second body to the fourth side of the second body, and the third side of the second body connecting to the second side of the first body.

7. The cutting tool of claim 6, wherein the first side of the first cutter includes a pad; and the third side of the second cutter includes the pad.

8. A method of machining rotors, applied to a control unit and a cutting tool designed according to claim 1, the control unit presetting a first spin-rate parameter of the cutting tool and a second spin-rate parameter of a second workpiece, and comprising steps of:

reading the first spin-rate parameter and the second spin-rate parameter by the control unit, spinning the cutting tool at a first spin rate and a spin direction, spinning the second workpiece at a second spin rate and the spin direction, a spin-rate ratio of the first spin rate to the second rate being inversely proportional to a gear ratio of the cutting tool to the second workpiece; and controlling the cutting tool and the second workpiece to perform synchronous machining by the control unit and cutting the second workpiece for producing a rotor by the cutting tool.

9. The method of machining rotors of claim 8, wherein the synchronous machining can include the cutting tool being fed to the second workpiece, the second workpiece being fed to the cutting tool, and the cutting tool and the second workpiece being mutually fed.

10. The method of machining rotors of claim 9, wherein the rotor can be a lead screw, a gear, a worm screw, an annular grinding wheel, or a workpiece with a spiral groove.

11. The method of machining rotors of claim 9, wherein the rotor includes a plurality of external threads; the plurality of external threads include a plurality of adjacent external thread grooves; and the plurality of external thread grooves correspond to a plurality of first cutters of the cutting tool.

12. The method of machining rotors of claim 9, wherein an axis of the second workpiece is away from an axis of the cutting tool by a shaft distance and two axes form a shaft angle.

* * * * *